(12) United States Patent
Baumann et al.

(10) Patent No.: US 6,227,204 B1
(45) Date of Patent: May 8, 2001

(54) DEVICE AND PROCESS FOR CHARGING OF RECHARGEABLE BATTERIES OF IMPLANTS

(75) Inventors: Joachim Baumann, München; Hans Leysieffer, Taufkirchen; Andreas Volz, München, all of (DE)

(73) Assignee: Implex Aktiengesellschaft Hearing Technology, Ismaning (DE)

( * ) Notice: Subject to any disclaimer, the term of this patent is extended or adjusted under 35 U.S.C. 154(b) by 0 days.

(21) Appl. No.: 09/311,566

(22) Filed: May 14, 1999

(30) Foreign Application Priority Data

Aug. 21, 1998 (DE) .............................................. 198 38 137

(51) Int. Cl.[7] .................................................... A61B 19/00
(52) U.S. Cl. ............................................................ 128/899
(58) Field of Search ............................... 628/899; 607/33, 607/34, 32, 29

(56) References Cited

U.S. PATENT DOCUMENTS

| | | |
|---|---|---|
| 5,277,694 | 1/1994 | Leysieffer et al. . |
| 5,279,292 | 1/1994 | Baumann et al. . |
| 5,411,467 | 5/1995 | Hortmann et al. . |
| 5,411,537 | 5/1995 | Munshi et al. . |
| 5,690,693 | 11/1997 | Wang et al. . |
| 5,702,431 | 12/1997 | Wang et al. . |
| 5,814,095 | 9/1998 | Müller et al. . |

FOREIGN PATENT DOCUMENTS

| | | |
|---|---|---|
| 26 34 974 | 1/1978 | (DE) . |
| 44 14 134 | 11/1994 | (DE) . |
| 2 139 434 | 11/1984 | (GB) . |

OTHER PUBLICATIONS

Halaczek/Radecke, Batteries and Charging Concepts, 2ND Edition, 1998, p. 148, Franzis' Verlag GMBH.

Primary Examiner—John P. Lacyk
Assistant Examiner—Brian Szmal
(74) Attorney, Agent, or Firm—Nixon Peabody LLP; David S. Safran

(57) ABSTRACT

A device and a process for charging of rechargeable NiCd, Ni-metal hydride or lithium batteries (12) of implants by transcutaneous transmission of electric power from an external power transmission part (11) to a power receiving part (10) which forms a part of the implant. The charging device is provided with a charging current detector (27, 32, 34) which, in a first charging phase (T1), allows a relatively high charging current ($I_L$) to flow and which, after the cell voltage ($U_Z$) of the battery has reached a predetermined limiting charging voltage ($U_G$), in a second charging phase (T2), reduces the charging current as compared to the charging current which flows at the end of the first charging phase. The charging current detector is made such that, during the second charging phase, it sets the charging current to a value causing the cell voltage during the second charging phase to be kept at least approximately at a predetermined constant voltage value ($U_G$).

30 Claims, 3 Drawing Sheets

DEVICE AND PROCESS FOR CHARGING OF RECHARGEABLE BATTERIES OF IMPLANTS

BACKGROUND OF THE INVENTION

1. Field of the Invention

The invention relates to a charging device for charging of rechargeable NiCd, Ni-metal hydride or lithium batteries of implants (with one or more cells or with one or more secondary elements, as required) by transcutaneous transmission of electric power from an external power transmission part to a power receiving part which forms a part of the implant, the charging device being provided with a charging current detector which in a first charging phase allows a relatively high charging current to flow and which, after the cell voltage of the battery has reached a predetermined limiting charging voltage, in a second charging phase reduces the charging current compared to the charging current which flows at the end of the first charging phase. The invention furthermore relates to a process for charging of implanted batteries of implants by transcutaneous transmission of electric power in which, in the first charging phase, a relatively high charging current flows, and in which, after the cell voltage of the battery has reached a predetermined limiting charging voltage, in a second charging phase, the charging current is reduced compared to the charging current flowing at the end of the first charging phase.

2. Description of Related Art

When a battery is charged, only one part of the supplied electric power is converted into charge. Another part of this power is converted into heat on the internal resistance of the battery and is lost for charging. The power loss can lead to an impermissible temperature rise of the implant housing, and thus, to damage of the surrounding tissue.

Another part of the supplied energy drives secondary electrochemical reactions which, for example, lead to gas evolution within the battery. This applies mainly when the battery has reached a higher charging level, for example, is charged to more than 80% of its nominal capacity. Especially over years of operation of an implanted battery does the capacity ratio of the positive and negative electrodes of the battery cell or cells shift due to electrolyte loss and passivation of the electrode surfaces and/or by corrosion with time, such that, during charging (i.e., re-charging), a greater and greater preponderance of the gas-forming over the gas-consuming reactions occurs, and thus, the internal pressure of the cell rises quickly during charging. As the gas pressure rises the cell housing swells, which under certain circumstances can lead to destruction of the cell or the implant. The increasing corrosion and/or passivation of the electrodes and the decrease of the electrolyte-wetted electrode surface, at the same time, cause an increase of the internal resistance of the battery.

In one such charging device and a charging process of the indicated type, use of a charging protocol is known (U.S. Pat. Nos. 5,690,693; 5,702,431 and 5,411,537) which provides for either the instantaneous charging current or the duty factor of a fixed charging current to be reduced as the charging level of the battery increases. Thus, in U.S. Pat. No. 5,411,537, a multistage charging process for lithium batteries is proposed in which, during the charging process, the no-load voltage of the battery is periodically interrogated to estimate the charging state of the battery, and in which, depending on the no-load voltage determined at the time, one of several predetermined charging current values is selected, the charging current values becoming smaller as the no-load voltage increases. The charging process is ended when the measured no-load voltage exceeds a stipulated boundary value.

U.S. Pat. No. 5,702,431 discloses an alternative of the above described multistage charging process in which the amplitude of the charging current remains constant, but the charging current is pulse width modulated and the duty factor is changed depending on the periodically determined no-load voltage values. Similarly, in U.S. Pat. No. 5,690,693, a pulse width modulation device with a variable duty cycle is used as a controller for the current level applied during the charging process.

SUMMARY OF THE INVENTION

The primary object of the present invention is to devise a device and a process for charging of rechargeable NiCd, Ni-metal hydride or lithium batteries of implants which, on the one hand, for the battery preclude harmful charging conditions with great reliability, and especially limit temperature evolution and gas formation in an implanted battery for the most part but, on the other hand, ensure effective, and thus, comparatively rapid, charging.

This object is achieved in a charging device in accordance with the invention by the charging current detector being made such that, in the course of the second charging phase, it sets the charging current to a value such that the cell voltage during the second charging phase is kept at least roughly to a predetermined constant voltage value.

A process in accordance with the invention is achieved by the charging current in the course of the second charging phase being set to a value such that the cell voltage is kept at least roughly to a predetermined constant voltage value.

In the device and process of the invention, the charging of the battery is regulated depending on the internal resistance of the battery. It is ensured that the cell is charged only with as much energy as the electrochemical state allows, without excess gassing or heating of the cell occurring. Older cells with increasing internal resistance, in this way, acquire less charge than new cells. Charging can be configured according to the individual patient needs without the immediate danger of overcharging, because the charging current is reduced when the limiting charging voltage is reached. An almost full cell reaches this limiting charging voltage very quickly and thus acquires only little additional charge by the end of the charging process due to the low charging current.

The implant can be basically any implantable medical or biological device. Thus, among others, it can be an active electronic hearing implant, a cardiac pacemaker, a defibrillator, a drug dispenser, a nerve or bone growth stimulator, a neurostimulator or retinal stimulator, a pain suppression device or the like.

The term lithium battery, as used here, is intended to encompass any rechargeable lithium systems, especially cells with liquid organic electrolytes, solid electrolytic cells, cells with inorganic electrolyte and lithium ion cells, such as carbon/lithium-cobalt oxide cells, carbon/lithium-nickel oxide cells, and carbon/lithium-manganese oxide cells with liquid or solid polymer electrolytes. Examples of known rechargeable lithium systems can be found in the aforementioned U.S. Pat. Nos. 5,702,431 and 5,411,537 and in Halaczek/Radecke "Batteries and Charging Concepts," 2nd edition, 1998, page 148, Franzis' Verlag GmbH.

Thus, the charging current detector is preferably made such that the predetermined value at which the cell voltage is kept in the course of the second charging phase is at least roughly equal to the value of the limiting charging voltage which is reached at the end of the first charging phase. In this way, after reaching the limiting charging voltage, in the further course of charging harmful effects on the battery are precluded while, at the same time, the charging rate remains high.

It goes without saying that the voltage value at which the cell voltage is kept in the course of the second charging phase need not be exactly constant. Practical experience has shown that this voltage value will deviate from the limiting charging voltage reached at the end of the first charging phase generally by not more than ±30%, preferably by not more than ±20%, and especially preferably by not more than ±10%.

According to one development of the invention, an arrangement is provided which acquires the time change of the charging current and ends the charging process when the change of the charging current per unit of time falls below a predetermined minimum value in the course of the second charging phase. This automatic cutoff of the charging process, likewise, contributes to prevention of overcharging of the cell. In addition, the total charging time can be reliably limited to a duration which, when exceeded, does not yield additional charging at a reasonable charging/time ratio.

In the course of the first charging phase, the charging current is advantageously limited to C/4 to 4C, conventionally C which is measured in amperes corresponding to the nominal capacity of the battery measured in ampere-hours. Thus, for example, for a battery with a nominal capacity of 2 Ah a charging current of 2C has a value of 4A.

Feasibly, in the course of the first charging phase, the charging current, in the case of Ni-metal hydride battery cells, is limited, or if necessary, regulated to a value of C/2 to 2C, preferably from C/2 to C and especially preferably from C/2 to 3/4C. In lithium battery cells, during the first charging phase, the charging current is limited or regulated to a value of C/4 to 4C, preferably to a value of C/2 to 2C, and especially preferably to a value of C/2 to C.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
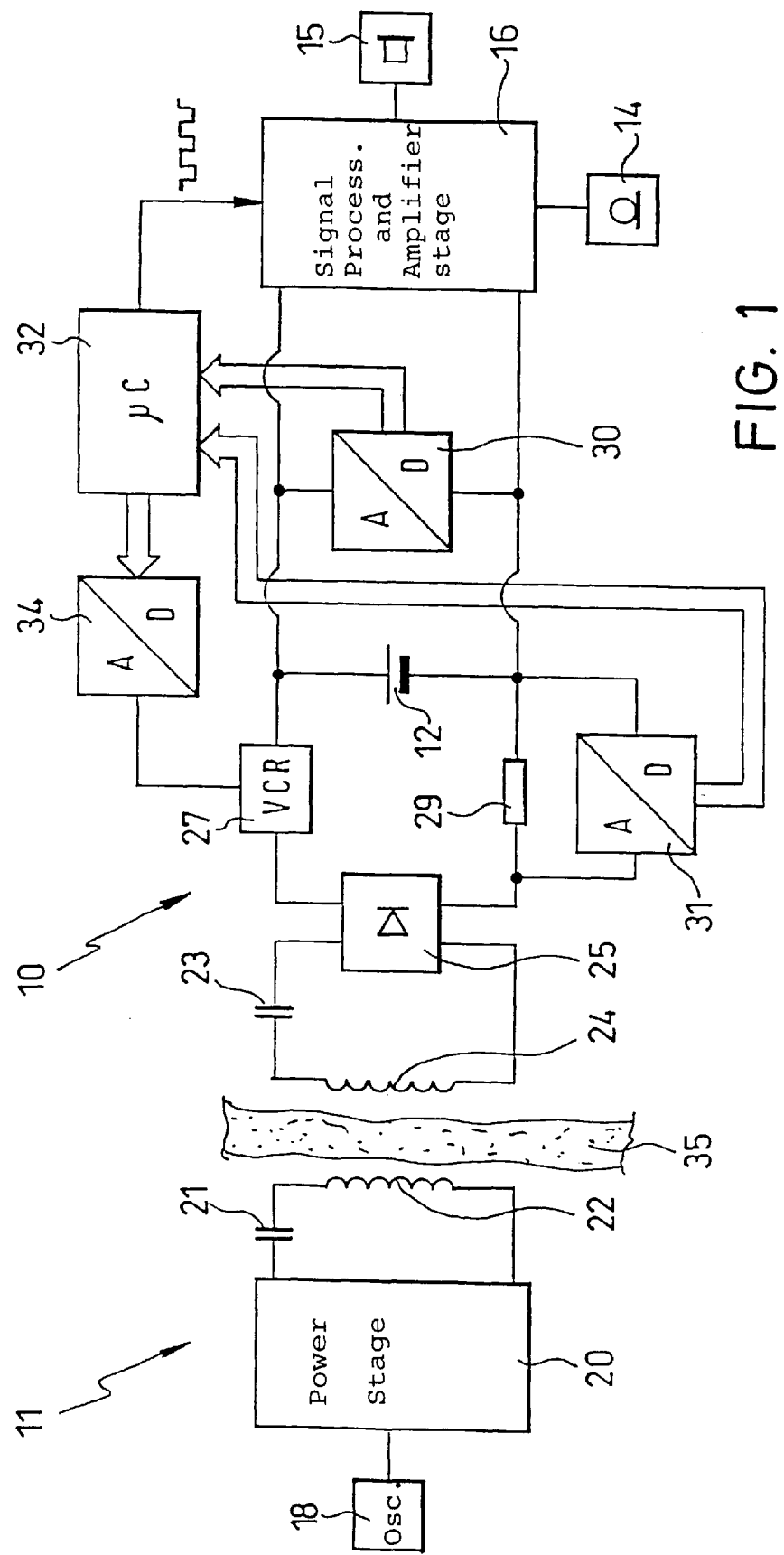
FIG. 1 shows a schematic circuit diagram of an electronic hearing implant with a charging device in accordance with the present invention.

The charging device shown in FIG. 1 has an implantable power receiving part 10 and an external (outside the body) power transmission part 11. The charging device is used to charge a rechargeable battery 12 which, for its part, in this embodiment, provides power to an active implantable electronic hearing aid. The hearing aid also includes, among other elements, a sensor unit 14, especially in the form of a microphone, an actuator unit 15 and a electronic signal processing and amplifier stage 16. The actuator unit 15 can be, for example, an electromechanical converter which can be coupled hydromechanically to the liquid filled spaces of the inner ear and mechanically to the ossicular chain. These converters are described in U.S. Pat. Nos. 5,277,694, and 5,411,467 and in published European Patent Application 0 831 674, and therefore, do not, themselves, form part of the present invention, and recourse can be had to these references for the details thereof.

The power transmission part 11 has an oscillator 18, an electronic power stage 20 and a series resonant circuit connected to the output side of the power electronic stage 20. The series resonant circuit is comprised of a capacitor 21 and an external field coil 22 in the illustrated embodiment.

The power receiving part 10 includes a series resonant circuit with a capacitor 23 and an implant coil 24. The series resonant circuit 23, 24 feeds a rectifier stage 25, that is preferably in the form of a full bridge circuit. The battery 12 is connected via a voltage controlled resistor (VCR) 27 to the output of the rectifier stage 25. The battery 12 feeds the signal processing and amplifier stage 16. Parallel to the battery 12 is an A/D converter 30 which acquires the cell voltage $U_Z$ of the battery. In the charging current circuit of the battery 12, between the rectifier stage 25 and the battery 12, is a current measuring resistor 29 connected in parallel to the A/D converter 31. A microcontroller 32 accepts input signals from the A/D converters 30 and 31. The signal processing and amplifier stage 16 and a D/A converter 34 connected to the VCR 27 are connected to the outputs of the microcontroller 32.

The two series resonant circuits 21, 22 and 23, 24 are tuned to the frequency of the oscillator 18. This resonant charging device is known in principle from U.S. Pat. No. 5,279,292.

A charging process begins with the external field coil 22 being placed on the outside of the skin 35 of the implant wearer such that it is aligned at least approximately with the implant coil 24. The electronic power stage 18, in interaction with the oscillator 18, preferably in the manner known from U.S. Pat. No. 5,279,292, an alternating current supplies to the field coil 22 which has a frequency in the range from 40 kHz to 50 MHz. The alternating electromagnetic field produced by the field coil 22 transcutaneously induces in the implant coil 24 an alternating current which is rectified in the rectifier stage 25. The battery 12 is charged with the rectified charging current $I_L$ via the VCR 27 which is in series with the output of the rectifier stage 25, the instantaneous resistance value of the VCR 27, which is controlled by the microcontroller 32 via the D/A converter 34, determining the charging current $I_L$ supplied to the battery from the rectifier stage 25. The size of the charging current $I_L$ is determined from the voltage drop on the current measuring resistor 29, and a corresponding measured quantity travels to the microcontroller 32 via the A/D converter 31.

The battery 12 is a rechargeable NiCd, Ni-metal hydride or lithium battery. This battery typically has a charging characteristic of the type shown in FIG. 2. The charging characteristic shows the cell voltage $U_Z$ of the battery depending on the time t at a constant charging current $I_L$. As is shown, the cell voltage $U_Z$ rises to a maximum $U_{Max}$ and then drops by $\Delta U$.

Figure 2:
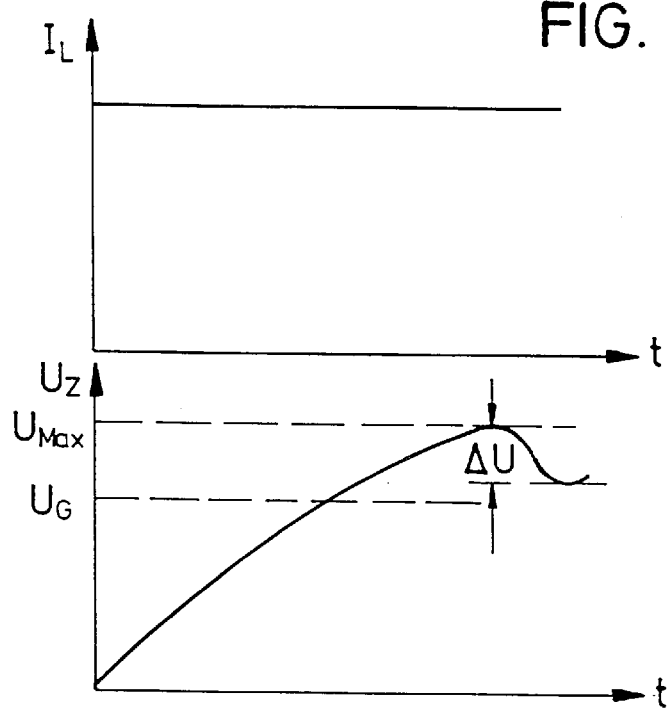
FIG. 2 shows charging characteristics of a battery charged with a constant current.
Figure 3:
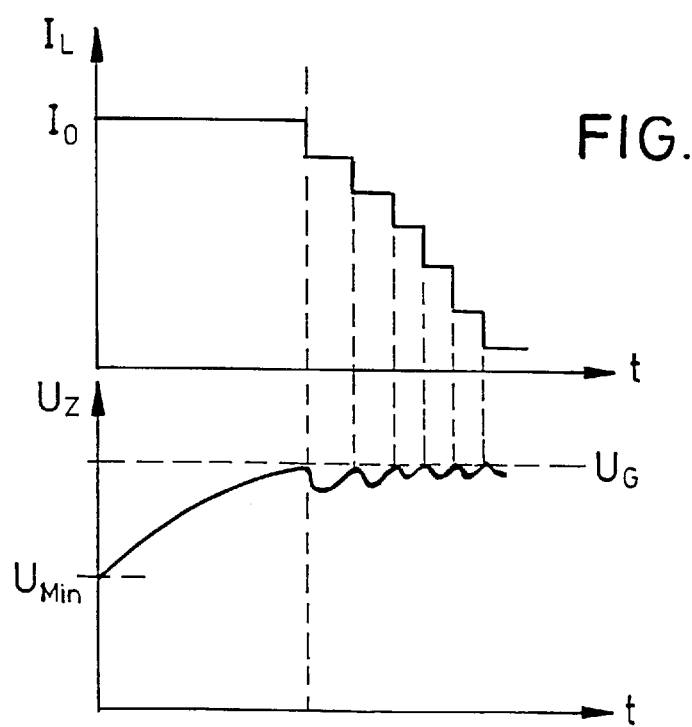
FIGS. 3 to 5 each show charging characteristics of a battery charged by means of the charging device in accordance with a respective charging technique of the present invention.

Here, stages 32, 34 and 27 are designed such that, in the manner shown in FIG. 3, charging of the battery 12 with a high current charging phase begins similarly to FIG. 2. In this first charging phase T1, the charging current $I_L = I_O$ is selected such that, on the one hand, charging as fast as possible is achieved but, on the other hand, battery damage is precluded with certainty. In the case of Ni-metal hydride battery cells, the charging current $I_L$ in the high current charging phase T1 is advantageously limited to a value from C/2 to 2C, preferably C/2 to C, and especially preferably from C/2 to 3/4C. In lithium battery cells, during the high current charging phase, limiting of the charging current $I_L$ to a value of C/4 to 4C, preferably to a value from C/2 to 2C and especially preferably to a value from C/2 to C, takes place. It is also possible to control the charging current $I_L$ during the high current charging phase using the measured current value acquired via the A/D converter 31 to a stipulated setpoint. In this first charging phase, the cell voltage $U_Z$ rises continuously.

When monitoring of the cell voltage $U_Z$ of the battery 12 by the microcontroller 32 via the A/D converter indicates that the cell voltage has reached a limiting charging current $U_G$, the microcontroller 32, via the D/A converter 34 and the VCR 27, sets back the charging current $I_L$ for a second charging phase T2 in appropriately chosen steps such that the cell voltage $U_Z$ remains at least roughly constant for the further progression of the charging process, as depicted in FIG. 3. In turn, the limiting charging voltage $U_G$ is selected such that the battery cannot be damaged during charging. Preferably, the limiting charging voltage $U_G$ is less than $U_{Max}$ minus $\Delta U$. In Ni-metal hydride battery cells, a limiting charging voltage $U_G$ in the range from 1.3 to 2.5 volts and preferably from 1.4 to 1.5 volts is possible. In 2 volt lithium systems, a limiting charging voltage $U_G$ from 1.2 to 2.5 volts and preferably from 1.5 to 2.3 volts is usable. For 4 volt lithium systems, especially a limiting charging voltage $U_G$ from 3.6 to 4.5 volts and preferably from 3.8 to 4.3 volts is suitable. In the second charging phase T2, the cell voltage $U_Z$ should not vary or deviate from the limiting charging voltage $U_G$ by more than $\pm30\%$, preferably by not more than $\pm20\%$ and especially preferably by not more than $\pm10\%$.

Preferably, the arrangement is such that, by means of microcontroller 32, the time change of the charging current, i.e. the value $\Delta I_L/\Delta t$, is acquired during the second charging phase T2, and the second charging phase, and thus also the overall charging process, are ended when a predetermined slope of the charging current curve is not reached, in other words, when $\Delta I_L/\Delta t$ is less than a stipulated minimum value. Determination of $\Delta I_L/\Delta t$ can then be performed directly by acquiring the voltage which drops on the current measuring resistor 29 via the A/D converter 31. However, it is also possible to derive $\Delta I_L/\Delta t$ indirectly from the value which is stipulated by the microcontroller 32 for the VCR 27.

The microcontroller 32 is advantageously used, in the manner shown in FIG. 1, also to control the signal processing and amplifier stage 16. In addition, the program of the microcontroller 32 is preferably designed such that the signal and processing stage 16 prevents the microcontroller 32 from drawing additional power from the battery 12 when it is determined via the A/D converter 30 that the cell voltage $U_Z$ of the battery 12 has dropped to a stipulated minimum value $U_{Min}$. The explained means and measures effectively protect the battery 12 both against exhaustive discharging and also overcharging.

The means necessary to set the charging current $I_L$, in the described manner, depending on the cell voltage $U_Z$ of the battery 12 can, as shown in FIG. 1, be housed in an implantable power receiving part 10. Basically however ,it can also be in the external power transmission part 11 or distributed between both parts 10 and 11. The power transmission part 11 can be designed for supply with mains current and/or for feed from a battery located outside the body.

Figure 4:
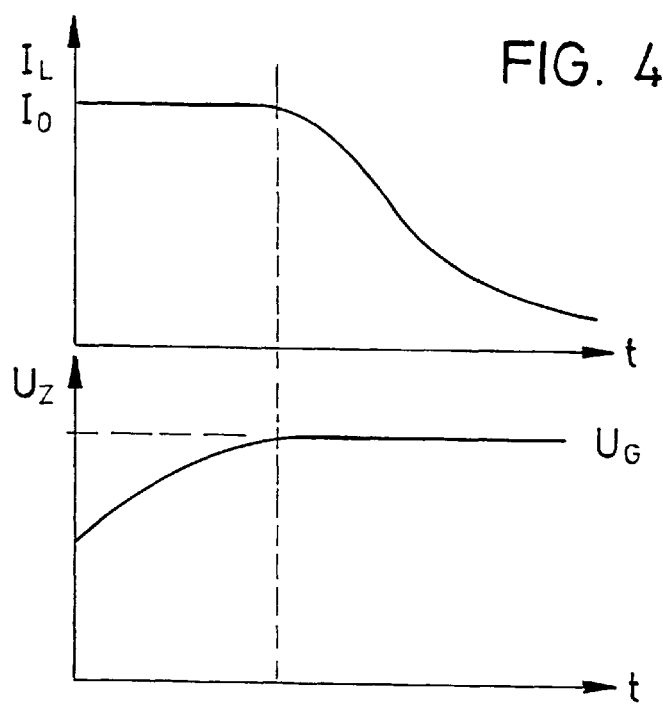

By choosing the correspondingly small values for $\Delta I_L$ and $\Delta t$, quasi-continuous behavior of the curves for the charging current $I_L$ and the cell voltage $U_Z$ can be achieved, as shown in FIG. 4. But, it also goes without saying, for one skilled in the art, that this continuous behavior can be achieved by using corresponding analogous circuit components.

Figure 5:
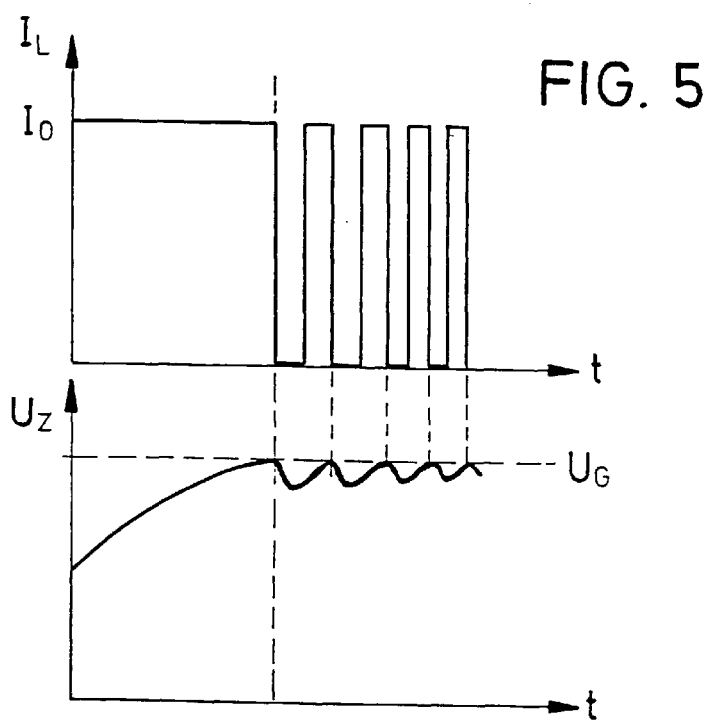

Furthermore, it is possible to control the VCR 27 via the microcontroller 32 such that it works as a pulse width modulator, in order to undertake the above described type of control of the charging current $I_L$ depending on the determined cell voltage $U_Z$ by pulse width modulation of the charging current $I_L$, as is illustrated in FIG. 5.

The microcontroller 32 can be programmed such that it can only start the charging process when a minimum current is flowing in the charging current circuit of battery 12.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Charging device for charging of rechargeable NiCd, Ni-metal hydride and lithium batteries of implants by transcutaneous transmission of electric power from an external power transmission part to a power receiving part which forms a part of the implant, the charging device comprising a charging current detector having control means for producing a first charging phase in which a relatively high charging current flow is produced which is limited to a stipulated maximum value and for producing a second charging phase in which the charging current is reduced as compared to the charging current which flows in the first charging phase after the cell voltage of a battery being charged has reached a predetermined limiting charging voltage, the reduced charging current in the second charging phase having a value causing the cell voltage to be kept at least approximately to a predetermined constant voltage value during the second charging phase.

2. Charging device as claimed in claim 1, wherein the predetermined constant value at which the cell voltage is kept by said control means during the second charging phase is at least approximately equal to the value of a limiting charging voltage reached at the end of the first charging phase.

3. Charging device as claimed in claim 2, wherein the predetermined constant value at which the cell voltage is kept by said control means during the second charging phase deviates from the limiting charging voltage reached at the end of the first charging phase by not more than $\pm30\%$.

4. Charging device as claimed in claim 3, wherein the predetermined constant value at which the cell voltage is kept by said control means during the second charging phase deviates from the limiting charging voltage reached at the end of the first charging phase by not more than $\pm20\%$.

5. Charging device as claimed in claim 3, wherein the predetermined constant value at which the cell voltage is kept by said control means during the second charging phase deviates from the limiting charging voltage reached at the end of the first charging phase by not more than $\pm10\%$.

6. Charging device as claimed in claim 1, further comprising an arrangement for acquiring the rate of change of the charging current and for ending the charging process when the change of the charging current per unit of time falls below a predetermined minimum value in the course of the second charging phase.

7. Charging device as claimed in claim 1, wherein the charging current detector has means for limiting the charging current during the first charging phase to C/4 to 4C, where C is the nominal capacity of the battery measured in ampere-hours.

8. Charging device as claimed in claim 6, wherein the means for limiting limits the charging current to C/2 to C in the case of Ni-metal hydride battery cells, and C/2 to 2C in the case of lithium battery cells.

9. Charging device as claimed in claim 6, wherein the means for limiting limits the charging current to C/2 to 3/4C in the case of Ni-metal hydride battery cells and C/2 to C in the case of lithium battery cells.

10. Charging device as claimed in claim 1, control means includes an arrangement for incrementally reducing the charging current during the second charging phase.

11. Charging device as claimed in claim 10, wherein the arrangement for incremental reduction of the charging current during the second charging phase has a microcontroller, a voltage controlled resistor which is controlled by the microcontroller, and a digital to analog converter which is connected between the microcontroller and resistor.

12. Charging device as claimed in claim 1, wherein the control means has an arrangement for reducing the charging current during the second charging phase by pulse width modulation of the charging current.

13. Charging device as claimed in claim 1, further comprising an analog to digital converter and a microcontroller for acquiring the cell voltage.

14. Charging device as claimed in claim 1, wherein the external power transmission part is battery-operated.

15. Process for charging of rechargeable NiCd, Ni-metal hydride and lithium batteries of implants by transcutaneous transmission of electric power, comprising the steps of performing a first charging phase in which charging current is limited to a relatively high value, and commencing a second charging phase when the cell voltage of the battery being charged reaches a predetermined limiting charging voltage, the charging current in the second charging phase being reduced as compared to the charging current flowing at the end of the first charging phase, and wherein the charging current in the course of the second charging phase is set to a value which keeps the cell voltage at least roughly to a predetermined constant voltage value.

16. Process as claimed in claim 15, wherein the predetermined voltage value at which the cell voltage is kept in the course of the second charging phase is at least roughly equal to the value of the limiting charging voltage which is reached at the end of the first charging phase.

17. Process as claimed in claim 15, wherein the predetermined voltage value at which the cell voltage is kept during the second charging phase deviates from the limiting charging voltage reached at the end of the first charging phase by not more than ±30%.

18. Process as claimed in claim 15, wherein the predetermined voltage value at which the cell voltage is kept during the second charging phase deviates from the limiting charging voltage reached at the end of the first charging phase by not more than ±20%.

19. Process as claimed in claim 15, wherein the predetermined voltage value at which the cell voltage is kept during the second charging phase deviates from the limiting charging voltage reached at the end of the first charging phase by not more than ±10%.

20. Process as claimed in claim 15, comprising the further steps of acquiring a rate of change of the charging current and ending the charging process when the change of the charging current per unit of time falls below a predetermined minimum value during the second charging phase.

21. Process as claimed in claim 15, wherein the charging current is limited to C/4 to 4C during the first charging phase.

22. Process as claimed in claim 18, wherein the battery is a Ni-metal hydride battery and the charging current is limited a value of C/2 to C during the first charging phase.

23. Process as claimed in claim 18, wherein the battery is a Ni-metal hydride battery and the charging current is limited a value of C/2 to 3/4C during the first charging phase.

24. Process as claimed in claim 18, wherein the battery is a lithium battery and the charging current is limited a value of C/2 to 2C during the first charging phase.

25. Process as claimed in claim 18, wherein the battery is a lithium battery and the charging current is limited a value of from C/2 to C during the first charging phase.

26. Process as claimed in claim 15, wherein the charging current is smoothly reduced during the second charging phase.

27. Process as claimed in claim 15, wherein the charging current is incrementally reduced during the second charging phase.

28. Process as claimed in claim 15, wherein the charging current is reduced by pulse width modulation during the second charging phase.

29. Process as claimed in claim 15, wherein the transcutaneous transmission of electric power is performed using alternating current with a frequency in the range from 40 kHz to 50 MHz.

30. Process as claimed in claim 15, wherein the transcutaneous transmission of electric power is performed from an external power transmission part to a power receiving part which forms a part of the implant.

* * * * *